(12) United States Patent
Mori et al.

(10) Patent No.: US 7,591,679 B2
(45) Date of Patent: Sep. 22, 2009

(54) CONNECTOR AND MIRROR ANGLE ADJUSTMENT DEVICE

(75) Inventors: Fumikatsu Mori, Aichi-ken (JP); Yoshiaki Kato, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 11/750,040

(22) Filed: May 17, 2007

(65) Prior Publication Data

US 2007/0275598 A1  Nov. 29, 2007

(30) Foreign Application Priority Data

May 23, 2006  (JP) ............... 2006-143249

(51) Int. Cl.
*H01R 13/40* (2006.01)
(52) U.S. Cl. ............ 439/595; 439/694; 359/871
(58) Field of Classification Search ......... 439/595, 439/596, 694, 597, 689; 359/871, 872
See application file for complete search history.

(56) References Cited

U.S. PATENT DOCUMENTS

| | | | | |
|---|---|---|---|---|
| 5,106,326 A | * | 4/1992 | Tsuji et al. | 439/596 |
| 5,288,242 A | * | 2/1994 | Muzslay | 439/349 |
| 6,074,252 A | * | 6/2000 | Grieve | 439/620.32 |
| 6,089,924 A | * | 7/2000 | Wang | 439/694 |
| 6,109,975 A | * | 8/2000 | Nitta | 439/686 |
| 6,229,226 B1 | | 5/2001 | Kramer et al. | |
| 6,357,885 B2 | | 3/2002 | Sakamoto et al. | |
| 6,471,365 B2 | * | 10/2002 | Wang et al. | 362/84 |
| 6,966,799 B1 | * | 11/2005 | Wang | 439/694 |

FOREIGN PATENT DOCUMENTS

| | | |
|---|---|---|
| DE | 93 07 884 U1 | 10/1994 |
| DE | 195 11 410 A1 | 10/1996 |
| EP | 1 279 556 A2 | 1/2003 |
| FR | 2 308 218 A1 | 11/1976 |
| JP | 3345372 B2 | 8/2002 |
| JP | 2005-280503 A | 10/2005 |
| WO | 2005/112201 A1 | 11/2005 |

* cited by examiner

*Primary Examiner*—Hien Vu
(74) *Attorney, Agent, or Firm*—Roberts Mlotkowski Safran & Cole, P.C.; Thomas W. Cole

(57) ABSTRACT

A connector, comprising: a terminal that is an elongated member connected to a wire harness, the axial direction of the wire harness intersecting with the longitudinal direction of the terminal at a connecting portion therebetween; a housing, including a terminal retaining socket that retains the terminal, the terminal being inserted into the terminal retaining socket from a back face side of the housing and retained, with the leading end portion of the terminal protruding to a front face side of the housing, and the terminal being connected to a power supply point by the front face side of the housing being fitted together with a body to be fitted to; and a cover that is substantially plate shaped and covers the back face side of the housing, is provided.

13 Claims, 14 Drawing Sheets

US 7,591,679 B2

CONNECTOR AND MIRROR ANGLE ADJUSTMENT DEVICE

CROSS-REFERENCE TO RELATED APPLICATION

This application claims priority under 35 U.S.C 119 from Japanese Pat. Application No. 2006-143249, the disclosure of which is incorporated by reference herein.

BACKGROUND

1. Technical Field

The present invention relates to a connector that is connected to a motor or the like, and a mirror angle adjustment device that adjusts the mirror angle of a mirror body for a vehicle rear-view mirror.

2. Related Art

There is a mirror angle adjustment device mounted to a mirror body for a vehicle rear-view mirror, for adjusting the mirror angle. Furthermore, in the mirror angle adjustment device, there are proposals for providing drive portions with motors and the like, and, in order to supply power to these drive portions, connectors are connected to the motors of the drive portions (see connectors of Japanese Pat. No. 3345372).

With the connector described in JP No. 3345372, there is a wire harness connected to a terminal, and the terminal is inserted into a terminal mounting portion at a housing fitting face side (the side to which a motor is mounted), inserted along a housing plate, and engaged with an engagement projecting portion. At the connecting portion of the wire harness and the terminal, the axial direction of the wire harness is substantially parallel to the insertion direction to the terminal mounting portion for the terminal. Due to this, it is necessary to hook the wire harness to a pull-out prevention member so that even if a pulling-out force acts on the wire harness, the terminal is not pulled out of the terminal mounting portion.

However, in order to do so it is necessary to provide a pull-out prevention member on the back face side of the housing, and to run the wire harness, from the front face side of the housing, around to the back face side, so that any pulling-out force acting on the wire harness is taken by the housing. The running of the wire harness is cumbersome.

SUMMARY

The present invention is made in the light of the above circumstances and the object of the present invention is to obtain a connector with a pull-out prevention configuration that may eliminate the procedure of running the wire harness around and may increase the workability of assembly, and obtain a mirror angle adjustment device that is provided with such a connector.

A connector of a first aspect of the present invention is a connector comprising: a terminal that is an elongated member connected to a wire harness, the axial direction of the wire harness intersecting with the longitudinal direction of the terminal at a connecting portion there between; a housing, including a terminal retaining socket that retains the terminal, the terminal being inserted into the terminal retaining socket from a back face side of the housing and retained, with the leading end portion of the terminal protruding to a front face side of the housing, and the terminal being connected to a power supply point by the front face side of the housing being fitted together with a body to be fitted to; and a cover that is substantially plate shaped and covers the back face side of the housing.

According to the first aspect, the terminal is inserted into the terminal retaining socket of the housing and retained, and, at the connecting portion of the terminal and the wire harness, the longitudinal direction of the terminal and the axial direction of the wire harness intersect. Therefore, even if a pulling-out force acts on the wire harness, since the pulling-out force is not parallel to the direction of insertion/extraction of the terminal, the component of the pulling-out force acting on the wire harness which is in the terminal insertion/extraction direction becomes small. As a result, the terminal is not readily pulled out from the terminal retaining socket. In addition, the force generated by the pulling-out force acting on the wire harnesses, is taken by the housing via the terminal. As a result, the terminals are prevented from coming out by the housing. In this way, in the connector of the first aspect, there is no necessity to run the wire harnesses out from the front face side of the housing around to the back face side thereof in order to prevent the terminal from coming out, such as is the case in a conventional connector. Therefore the workability of assembly may be increased.

The connector of a second aspect is a connector of the first aspect in which there are plural of the terminals mounted at the housing, and the back face side of the housing is provided with a surrounding portion that surrounds mounting portions of the plural terminals in a frame shape; and a guide groove is provided at the surrounding portion, bundling together the wire harnesses connected to each of the terminals.

According to the second aspect, the wire harnesses connected to each of the terminals are bundled together by the guide groove provided at the surrounding portion of the housing. Therefore, the wire harnesses may be bundled together just by using the housing, without providing a separate member for bundling together the wire harnesses connected to each of the terminals.

The connector of a third aspect is a connector of the first aspect or the second aspect in which the cover is integrally connected to an edge portion of the housing, and a connecting portions there between are resiliently deformable or are plastically deformable, and the cover is mounted to the back face side of the housing by resilient deformation or by plastic deformation of the connecting portions, and by rotating the cover relative to the housing.

According to the third aspect, the connecting portions between the cover and the edge portion of the housing are resiliently deformable or are plastically deformable. Therefore, when mounting the cover to the back face side of the housing, the cover is mounted to the back face side of the housing by resilient deformation or by plastic deformation of the connecting portions between the cover and the edge portion of the housing, and by rotating the cover relative to the housing.

In the connector of the third aspect, in contrast to when the cover and the housing are made as separate members, the rotating radius of the cover relative to the housing is made substantially uniform by the connecting portions between the cover and the edge portion of the housing. Therefore, alignment of the cover to the mounting position becomes easy.

The connector of a fourth aspect is a connector of any one of the first aspect to the third aspect in which at least one of the housing or the cover is provided with a guide portion that guides the cover to a mounting position at the housing.

According to the fourth aspect, when the cover is mounted to the back face side of the housing, the cover is guided by the guide portion to the mounting position with the housing. Therefore, alignment of the cover to the mounting position becomes easy.

The connector of a fifth aspect is a connector of the fourth aspect in which the guide portion includes a guide opening provided on one of the housing or the cover; and a guide protrusion, provided on the other of the housing or the cover, the guide protrusion engaging with the guide opening, at least one of the guide opening or the guide protrusion being provided with a sloping portion or a tapered portion for leading the guide protrusion to an engagement position with the guide opening.

According to the fifth aspect, when engaging the guide opening with the guide protrusion, by providing at least one of the guide opening or the guide protrusion with a sloping portion or a tapered portion, the guide protrusion is led to the engagement position with the guide opening. Therefore, alignment of the cover to the mounting position becomes even easier.

The connector of a sixth aspect is a connector of any one of the first aspect to the fifth aspect in which there is an opening formed in the terminal, and there is a lance that is formed integrally to an inner peripheral face of the terminal retaining socket, the lance being resiliently deformable, and being swingable by resilient deformation by being pushed by the terminal when the terminal is inserted into the terminal retaining socket, the lance resiliently recovering, when the terminal is inserted into the terminal retaining socket and reaches the alignment position, and engaging with the opening of the terminal.

According to the sixth aspect, the terminal that is inserted into the terminal retaining socket and reaches the terminal alignment position is engaged with the lance. Therefore, the terminal is prevented from coming out of the terminal retaining socket by the lance. In this way, prevention of the terminal from coming out of the housing may be made even more certain.

The mirror angle adjustment device of a seventh aspect is a mirror angle adjustment device comprising: a connector of any one of the first aspect to the sixth aspect; a case, provided at a rear face side of a vehicle rear view mirror body and provided with retaining portions which swingably retain the mirror body, the case being fitted to a front face side of a housing of the connector as a body to be fitted to; and a swing portion including a motor that is provided inside of the case, is power supplied and is connected to a terminal of the connector, the swing portion adjusting the mirror angle of the mirror body by swinging the mirror body when power is supplied to the motor and the motor driven.

According to the seventh aspect, the front face side of the housing, for the connector of any one of the first aspect to the sixth aspect, is fitted with the case, and the terminal of the connector is connected to the motor. In this manner, the connector of any one of the first aspect to the sixth aspect, is fitted at the case, and therefore in the mirror angle adjustment device of the seventh aspect, there is no necessity to run the wire harnesses out from the front face side of the housing around to the back face side thereof, in order to prevent the terminal from coming out, such as is the case in a conventional connector. Therefore the workability of assembly may be increased.

The connector and the mirror angle adjustment device relating to the present invention may eliminate the process of running the wire harness around, and may improve the workability of assembly.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
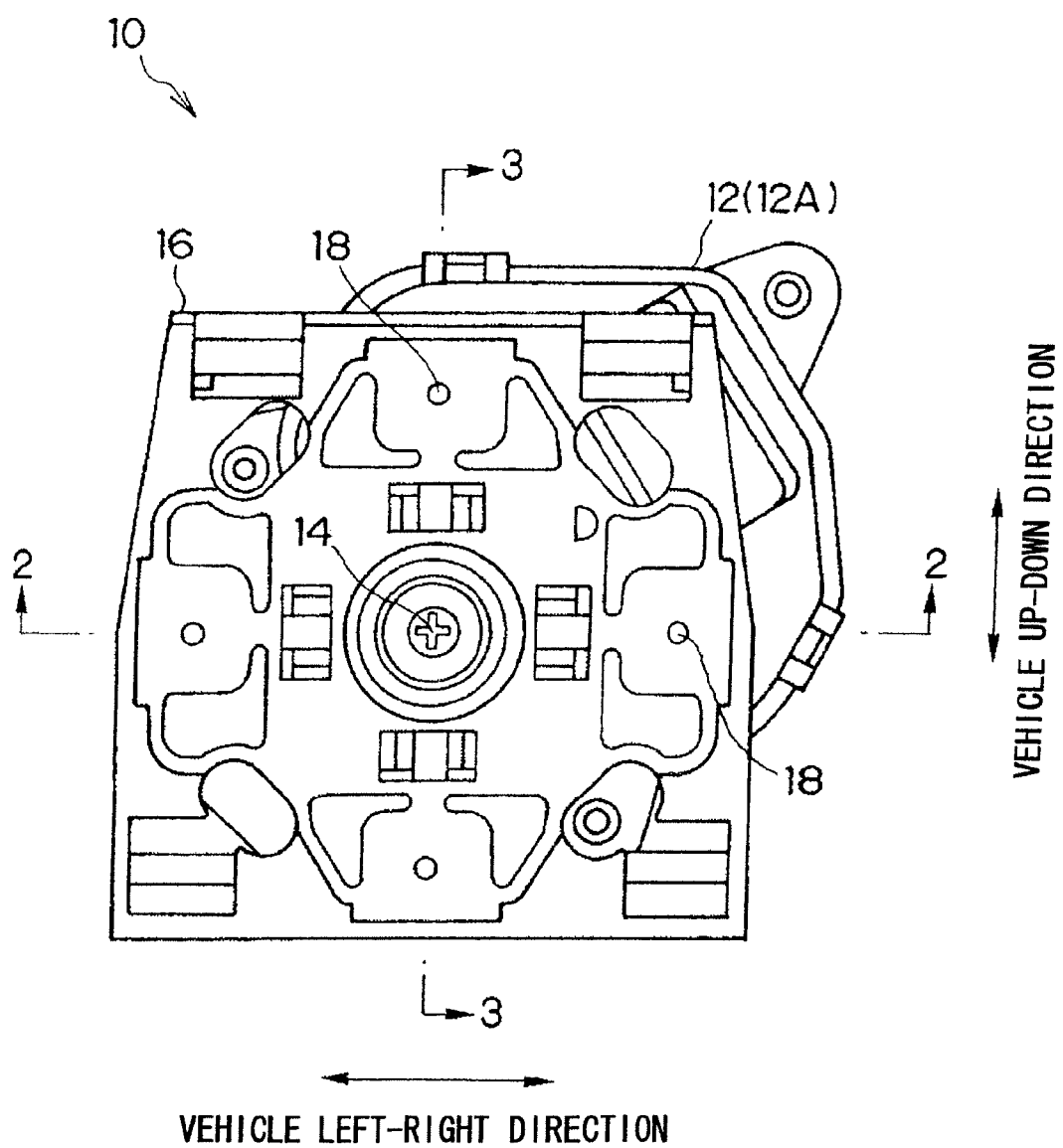
FIG. 1 is a front view of a mirror angle adjustment device relating to a first exemplary embodiment and a second exemplary embodiment of the present invention.
Figure 2:
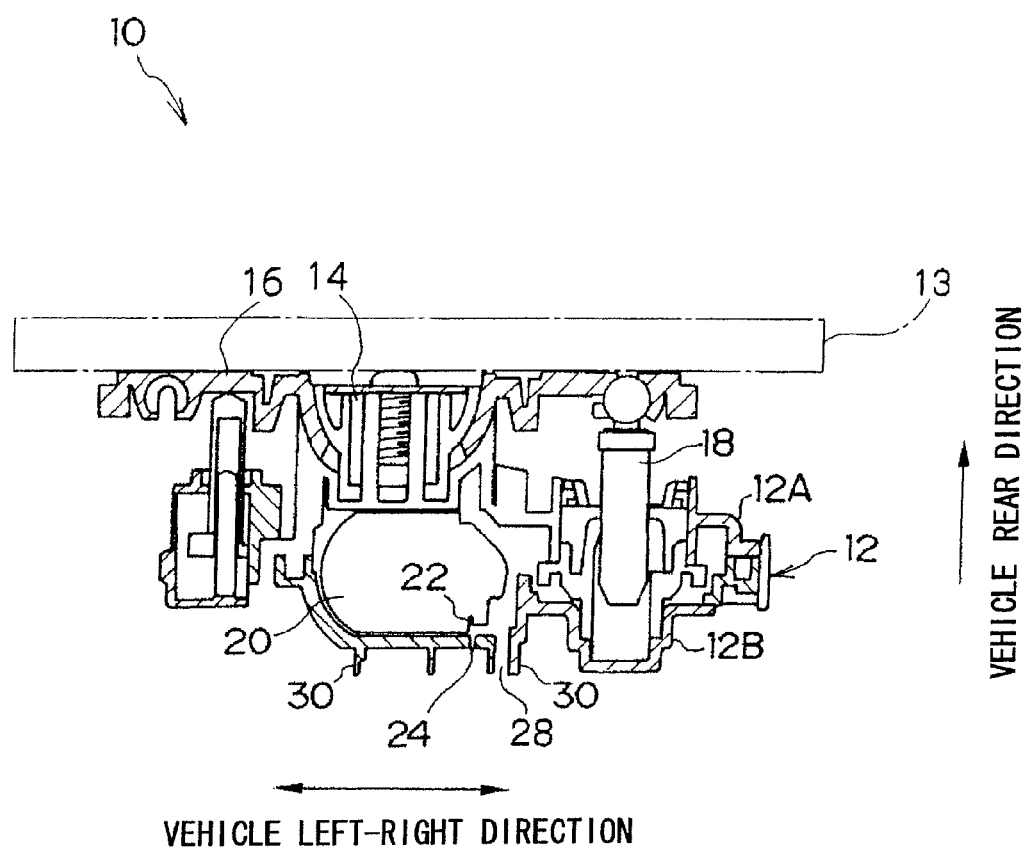
FIG. 2 is a cross-section taken on 2-2 of FIG. 1.
Figure 3:
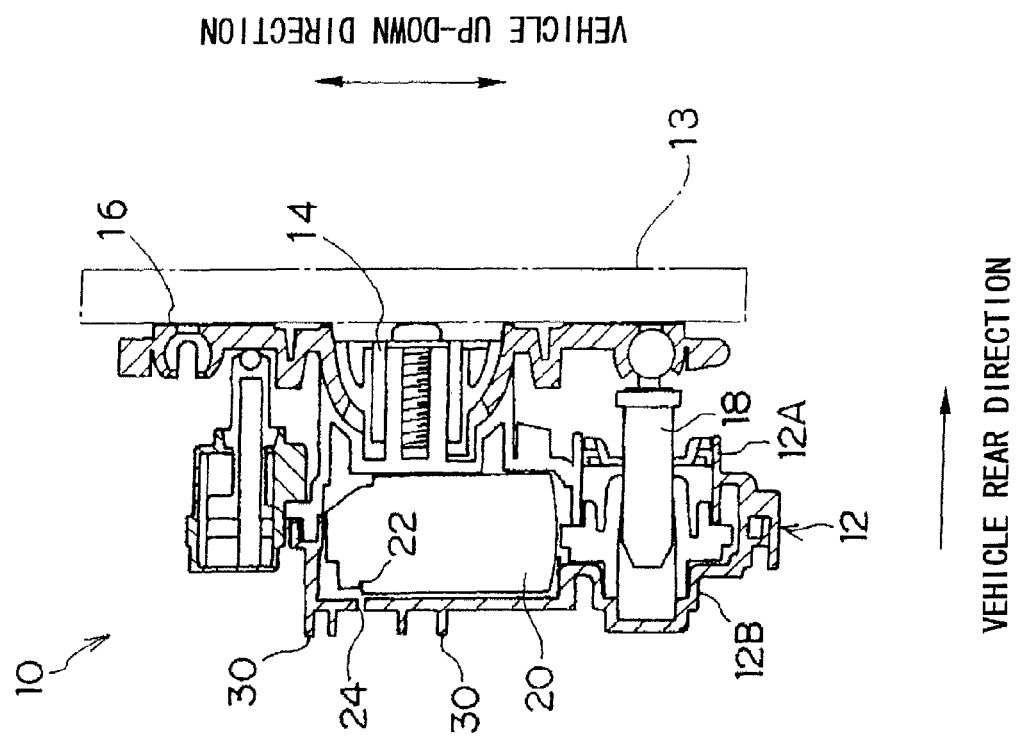
FIG. 3 is a cross-section taken on 3-3 of FIG. 1.

FIG. 1 is a front view of a mirror angle adjustment device 10 relating to a first exemplary embodiment and a second exemplary embodiment of the present invention. In addition, FIG. 2 shows a cross-section taken on 2-2 of FIG. 1, and FIG. 3 shows a cross-section taken on 3-3 of FIG. 1. Also, FIG. 4 shows a partial cut-away rear view of the mirror angle adjustment device 10.

Figure 4:
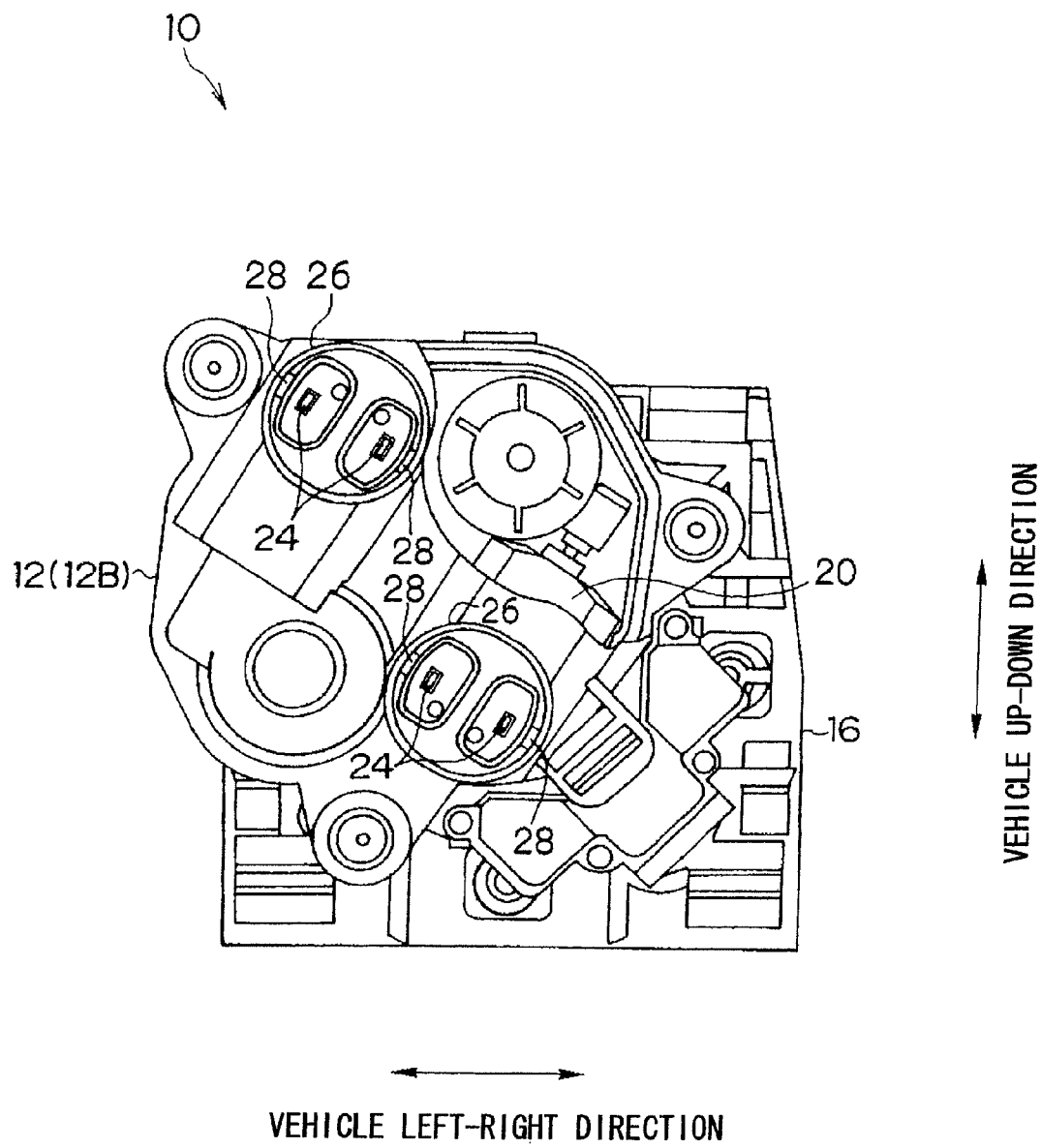
FIG. 4 is rear view of a partial cut-away of the mirror angle adjustment device relating to the first exemplary embodiment and the second exemplary embodiment of the present invention.

The mirror angle adjustment device 10 of the present exemplary embodiment is provided with a case 12 as a body to be fitted to, and the case 12 is disposed at the back face side (vehicle rearward side) of a mirror body 13 for a vehicle rear-view mirror (see FIG. 2 and FIG. 3, omitted in FIG. 1 and FIG. 4). The case 12 is configured with a lower case 12A on the mirror body 13 side, and an upper case 12B on the side that is opposite to the mirror body 13. A retaining portion 14 is provided on the mirror body 13 side of the case 12 (lower case 12A), and a mirror holder inner 16 is swingably retained at the retaining portion 14, so as to be able to swing. The mirror holder inner 16 is fixed to the rear face side of the mirror body 13, and by doing so, the mirror body 13 is swingably retained at the center of gravity of the mirror body 13 on the retaining portion 14.

A pair of rods 18 configuring a swing portion are provided at the mirror body 13 side of the case 12 (lower case 12A), and the ends of each of the rods 18 are inserted into the case 12, and each of the rods 18 is able to displace in the vehicle front-rear direction. One of the pair of rods 18 is arranged toward the top of the vehicle (or toward the bottom of the vehicle) relative to the above retaining portion 14, and the other of the pair of rods 18 is arranged toward the right of the vehicle (or toward the left of the vehicle) relative to the above retaining portion 14, and the mirror holder inner 16 is rotatably retained at the ends of each of the rods 18. Due to this, when each of the rods 18 displaces in the vehicle front-rear direction, the mirror body 13 swings about a vertical axis, or about a horizontal axis, centering on the retaining portion 14.

A pair of motors 20, configuring swing portions corresponding to the respective pairs of rods 18, is provided as power supply points at the inside of the case 12. There is a pair of receiving terminals 22 (female) provided corresponding to each of the motors 20 respectively, and each of the receiving terminals 22 is formed in a substantially cylindrical shape, and power may be supplied through the receiving terminals 22 to the motors 20. When power is supplied through the receiving terminals 22 to the motors 20, the motors 20 are driven, and the rods 18 are displaced in the vehicle front-rear direction. By doing so, the mirror body 13 is swung, centering on the retaining portion 14, and the mirror angle of the mirror body 13 is adjusted, as explained above.

At the opposite side of the case 12 to the mirror body 13 (upper case 12B side), there are four insertion holes 24 (a pair for each of the motors 20) that correspond to each of the receiving terminals 22, and that are formed as through holes. Furthermore, on the opposite side of the case 12 to the mirror body 13 (upper case 12B side) there are a pair of integrally protruding waterproofing walls 26 (one for each of the motors 20), and, as shown in FIG. 4, each of the waterproofing walls 26 is arranged to surround a pair of the insertion holes 24, surrounding the pair of insertion holes 24 in a substantially circular shape. Furthermore, on the opposite side of the case 12 to the mirror body 13 (upper case 12B side) there are four fitting holes 28 (a pair for each of the motors 20) that are formed as through holes, and the respective four fitting holes 28 are disposed on two lines that extend from straight lines connecting the respective pairs of insertion holes 24, at the inside of, and in the vicinity of, the waterproofing walls 26.

Figure 5:
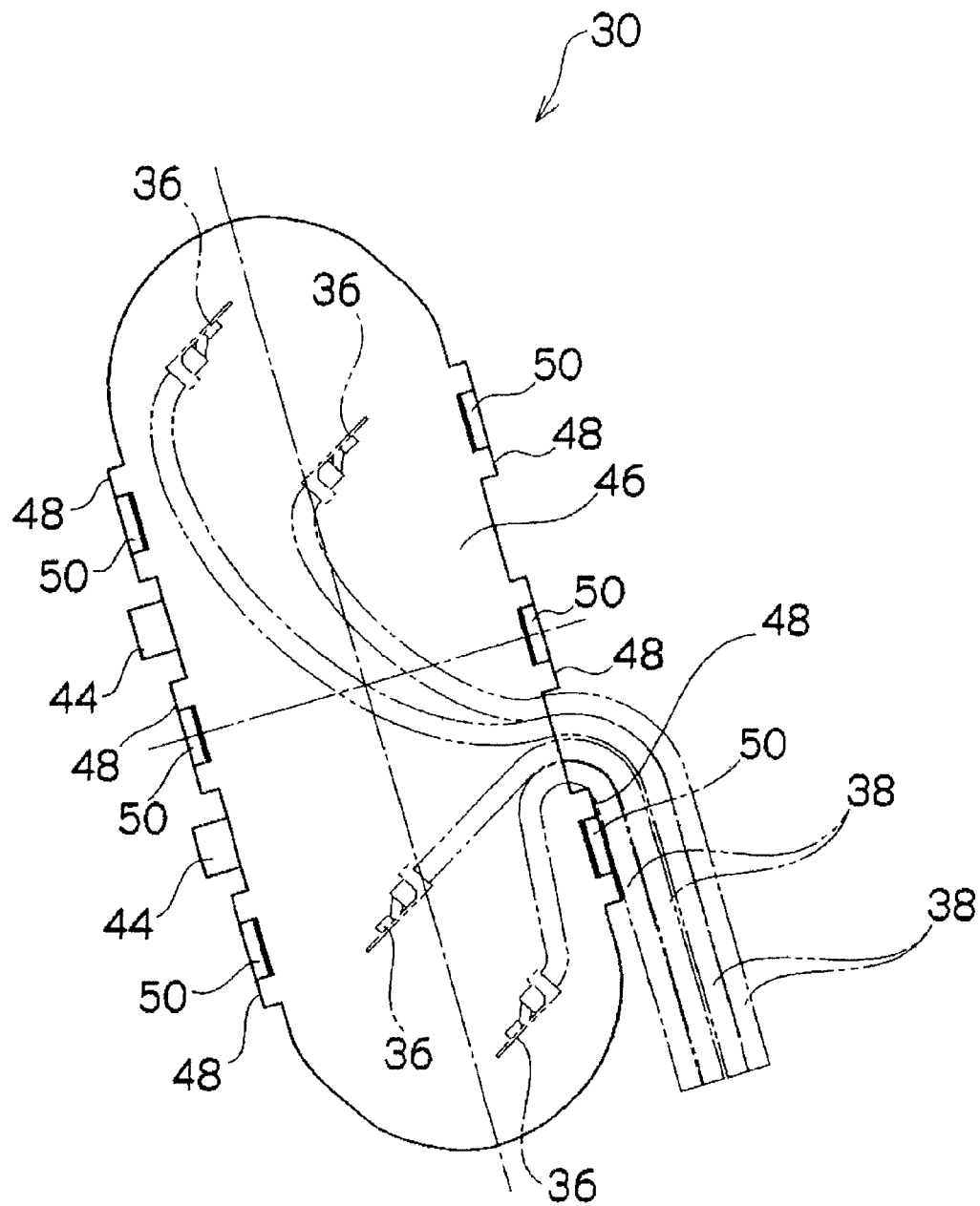
FIG. 5 is a rear view of a connector relating to the first exemplary embodiment of the present invention.

There is a connector 30 provided at the opposite side of the case 12 to the mirror body 13 (upper case 12B side), as shown in FIG. 5, corresponding to the pair of waterproofing walls 26. As shown in FIGS. 6 to 9, the connector 30 is provided with a closure plate 32 as a substantially oval shaped housing, and at the two end portions in the longitudinal direction of the closure plate 32 there are four (a pair for each of the motors 20) fitting lugs 34 protruding to the side of the case 12 (front side). Each pair of the fitting lugs 34 corresponds to each pair of the above fitting holes 28, and each of the fitting lugs 34 fits into the fitting hole 28 that corresponds to that fitting lug 34. Furthermore, on the case 12 side of the closure plate 32 there is a pair (one for each of the motors 20) of integrally protruding waterproofing walls 33, and each of the waterproofing walls 33 is integral to the base portions of one of the pairs of fitting lugs 34 and is arranged to surround a pair of terminal retaining sockets 35, surrounding the pair of terminal retaining sockets 35 in a substantially circular shape. Each of the waterproofing walls 33 is inserted within the respective waterproofing wall 26, and the closure plate 32 abuts the leading ends of the waterproofing walls 26. By doing so, the fitting portions of the closure plate 32 to the case 12 (in FIG. 6, the portions inside of the waterproofing walls 33 and the waterproofing walls 26) are closed by the waterproofing walls 33 and the waterproofing walls 26.

The terminal retaining sockets 35 formed in the closure plate 32 are formed to the shapes corresponding to long terminals 36, and there is a pair of the terminal retaining sockets 35 provided at each of the two end portions in the longitudinal direction of the closure plate 32. Each of the terminals 36 are respectively inserted into these terminal retaining sockets 35 from the back face side of the closure plate 32 (the opposite side of the closure plate 32 to the case 12) and retained within the terminal retaining sockets 35, and the leading end portions of the terminals 36 protrude to the case 12 side (the front side) of the closure plate 32.

Figure 10:
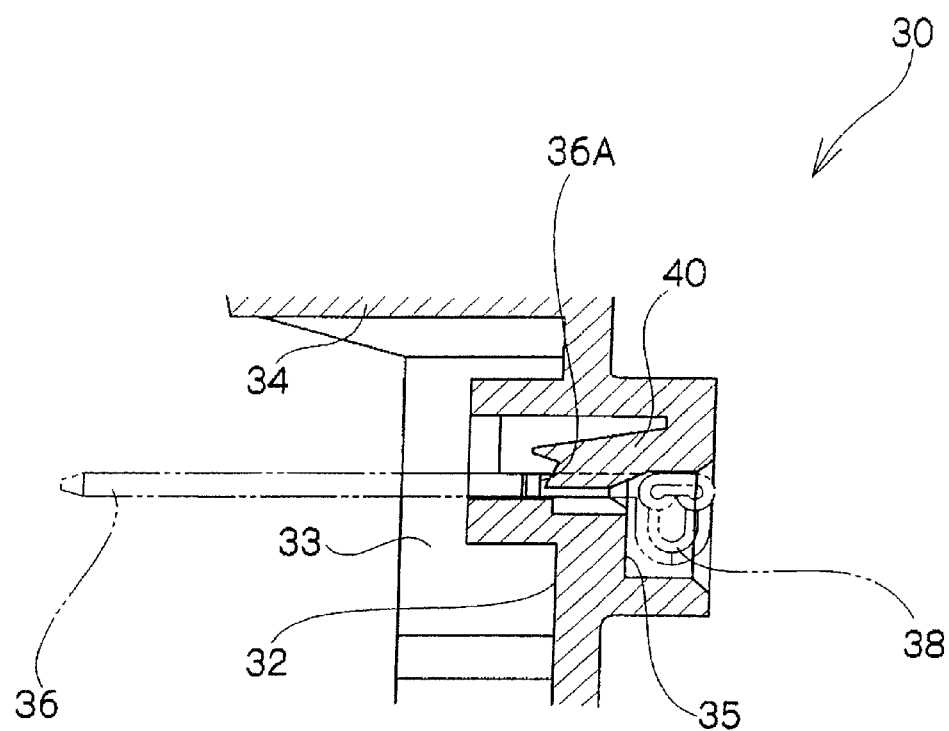
FIG. 10 is an expanded cross-section of the connector in the vicinity of one of the wire harnesses of FIG. 7.

The terminals 36, as shown in FIG. 10, are elongated in the direction of fitting into the case 12 of the connector 30, and the leading end portions and the intermediate portions of the terminals 36 are formed in a plate shape. Furthermore, openings 36A are formed in intermediate portions of the terminals 36, and the openings 36A are engaged with lances 40.

The lances 40 are formed integral to the inner peripheral surface of the terminal retaining sockets 35 of the closure plate 32 in the fitting direction of the connector 30 into the case 12, and the lances 40 extend toward the fitting direction leading end portion side of the connector 30. The lances 40 are resiliently deformable, and when the terminals 36 are inserted into the terminal retaining sockets 35, the lances 40 are pushed by the terminals 36 and resiliently deformed, and therefore are able to swing in the up-down direction of FIG. 10. When the terminals 36 are inserted into the terminal retaining sockets 35 and reach the alignment positions of the terminals 36, the lances 40 resiliently recover and engage with the terminals 36, and the terminals 36 are prevented from coming out from the terminal retaining sockets 35 by the lances 40.

Figure 11:
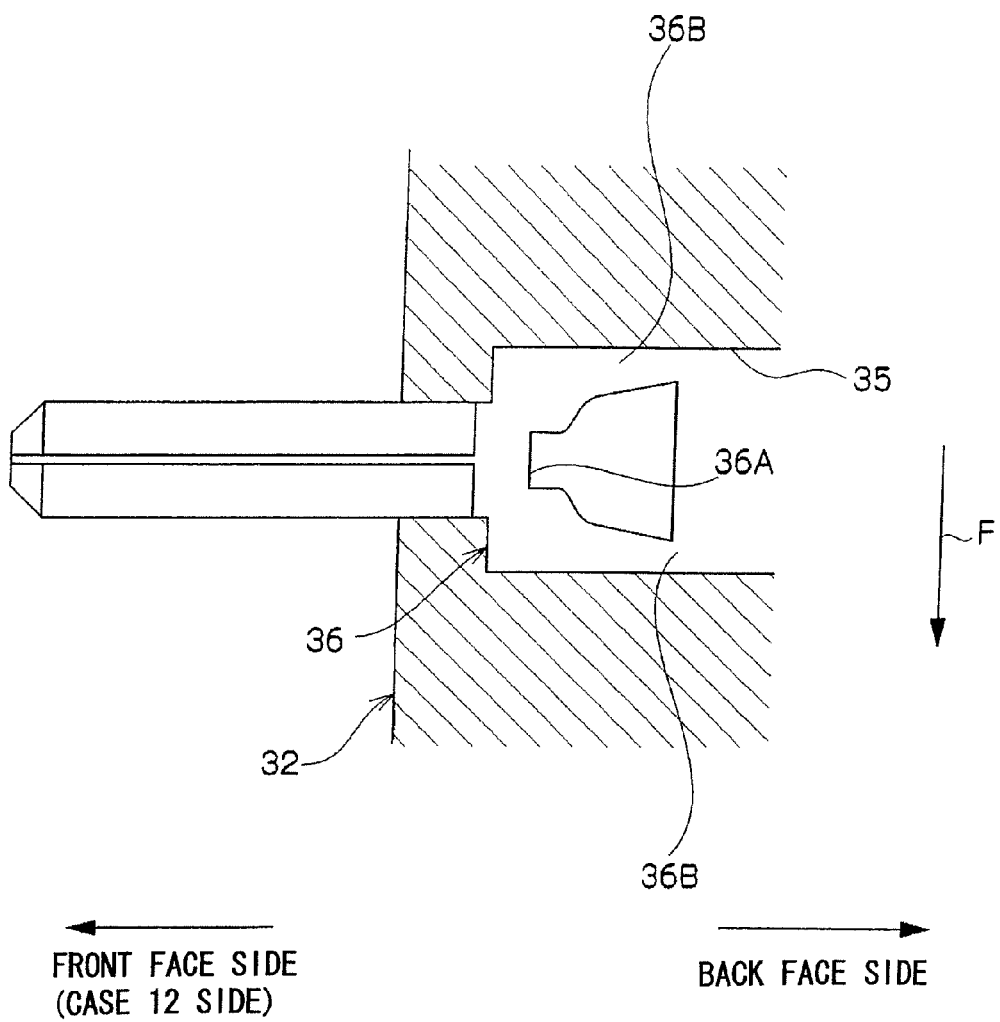
FIG. 11 is a cross-section taken on 11-11 of FIG. 6.

Also, as shown in FIG. 11, two width direction side portions 36B, which are at the ends in the direction that is orthogonal to both the longitudinal direction (left-right direction in FIG. 11) and the thickness direction (the direction into the page in FIG. 11) of the terminals 36, abut the inner walls of the terminal retaining sockets 35, and the edge portions of the side portions 36B are fixed to the closure plate 32. Due to this, when a force acts to pull-out wire harnesses 38 (in the direction of arrow F), the closure plate 32 is configured such that the force acting on the terminals 36 generated by the pulling-out force of the wire harnesses 38 (in this case a force that is substantially along the width direction of the terminals 36) is taken by the terminal retaining sockets 35.

At the closure plate 32, as described above, the four terminals 36 are integrally provided as they protrude to the case 12 side, and by the terminals 36 being inserted into the insertion holes 24, the terminals 36 are inserted into the inside of the receiving terminals 22 and connected to the receiving terminals 22.

Furthermore, on the back face side of the closure plate 32, the wire harnesses 38 are connected to the base end portions of the terminals 36. The axial direction of the wire harnesses 38 intersects with the longitudinal direction of the terminals 36 (in the present exemplary embodiment the axial direction is substantially orthogonally thereto along the width direction of the terminals 36), at the vicinity of the base end portions of the terminals 36 (in the vicinity of the connection portions to the terminals 36).

Figure 9:
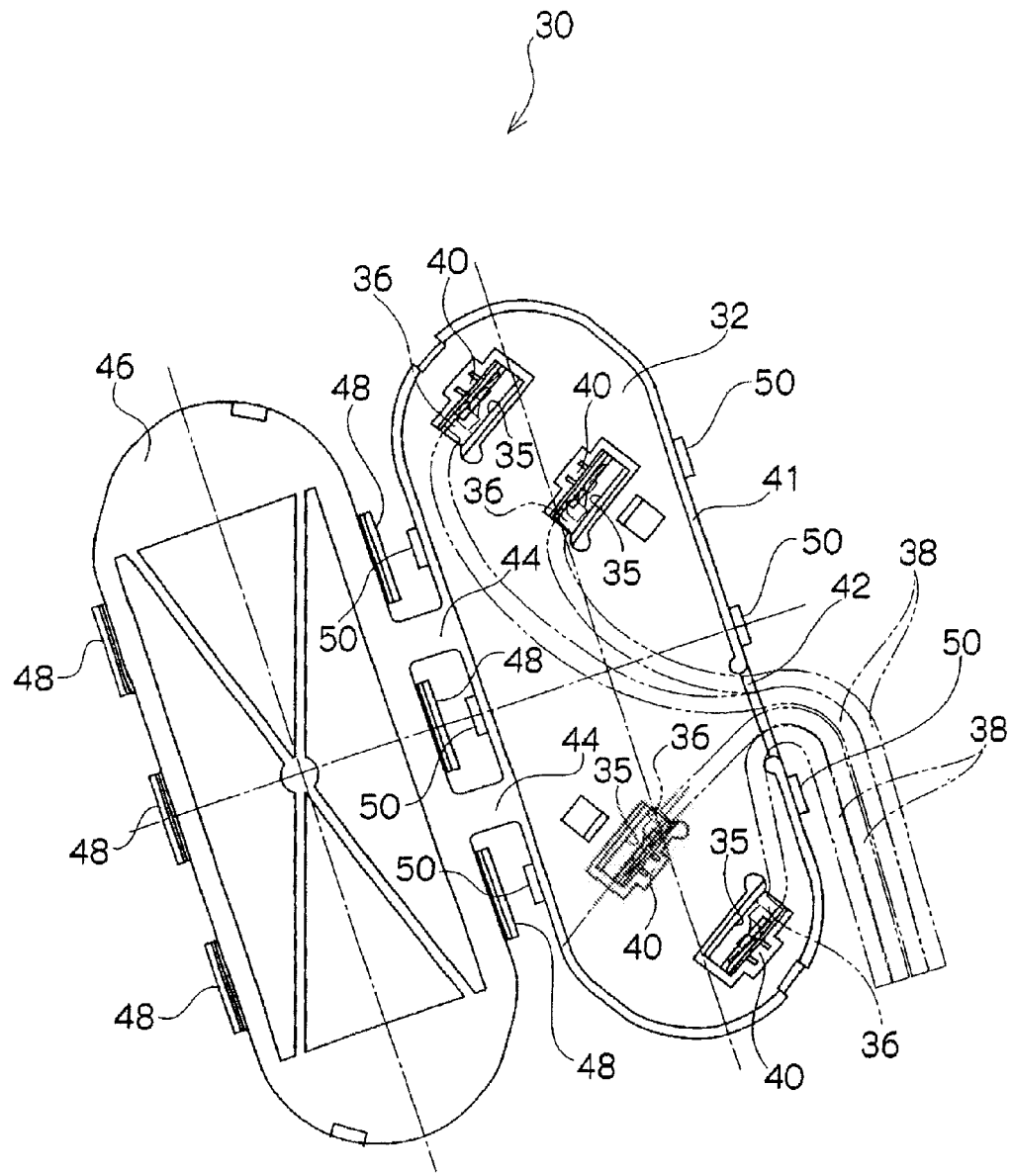
FIG. 9 is a back view of the connector in which terminals connected to wire harnesses are mounted to terminal retaining sockets.

Also, at the edge portion of the back face side of the closure plate 32 there is integrally provided a frame-shaped surrounding wall 41 as a surrounding portion, and the surrounding wall 41 surrounds the mounting portions of each of the terminals 36. A guide groove 42 is provided at one side of the surrounding wall 41 with respect to the longitudinal center line of the closure plate, and, as shown in FIG. 9, the wire harnesses 38 those are connected to each of the terminals 36 are disposed in the guide groove 42 of the connector, and the wire harnesses 38 are bundled together and guided by the surrounding wall 41 to the outside. Furthermore, the leading ends of the wire harnesses 38 are connected to a power source (omitted in the illustrations), and since the case 12 side of the closure plate 32 is fitted together with the case 12, power is supplied from the power source, through the wire harnesses 38 and the terminals 36, to the receiving terminals 22. Power is supplied to the motors 20 in this manner, and the motors 20 are driven.

Also, there is a pair of hinge portions 44 integrally provided at the surrounding wall 41 of the closure plate 32 on the opposite side of the guide groove 42 with respect to the closure plate 32 longitudinal center line. The pair of hinge portions 44 extend mutually parallel to each other in the direction orthogonal to the closure plate 32 longitudinal center line direction to the outside of the surrounding wall 41. The pair of hinge portions 44 is also resiliently deformable, and a cover 46 is rotated relative to the closure plate 32 with resilient deformation of the hinge portions 44, and thereby the cover 46 being placed on the back face side of the closure plate 32.

Figure 6:
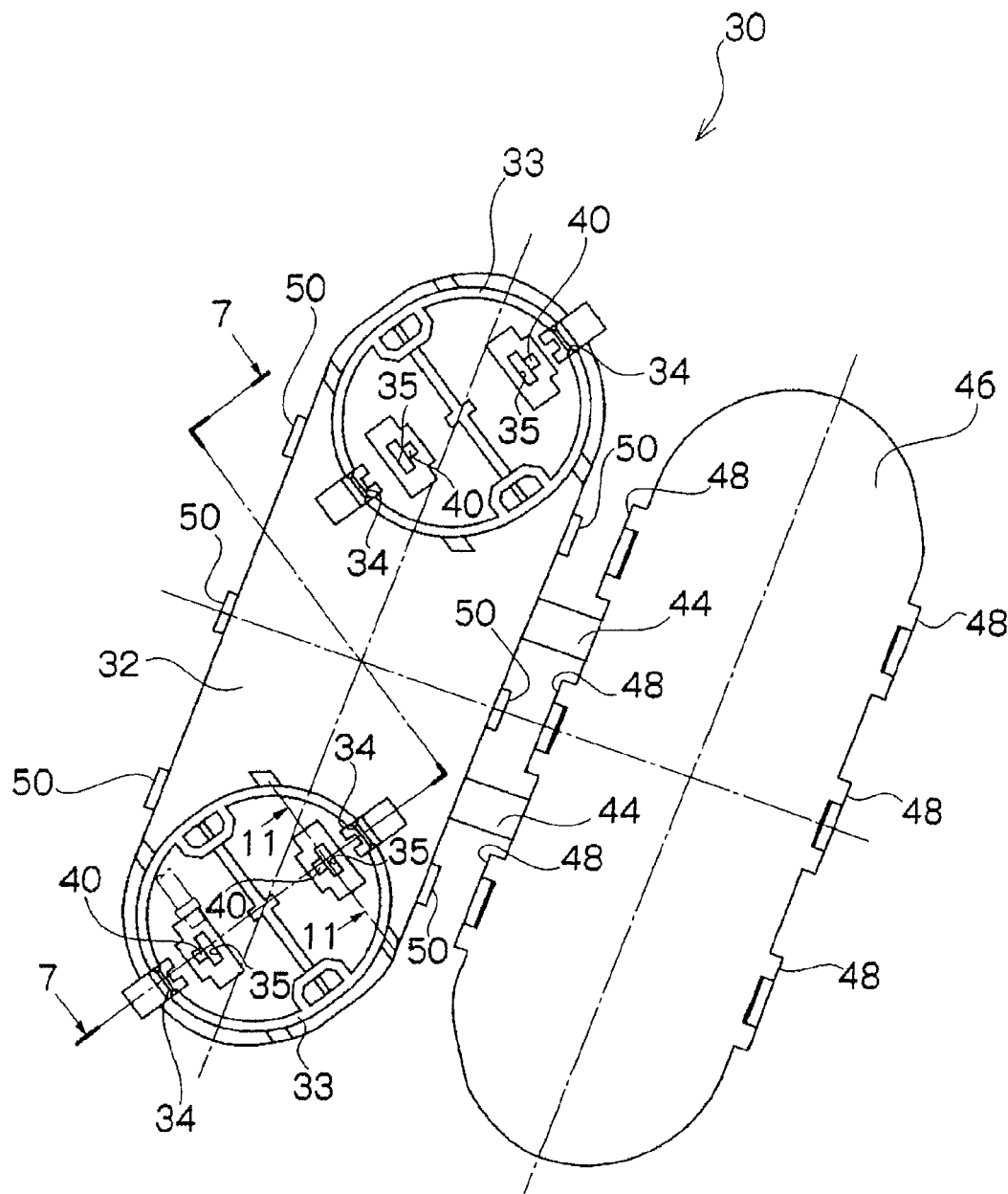
FIG. 6 is a plan view of the connector before the back face side of a closure plate is covered with a cover.
Figure 7:
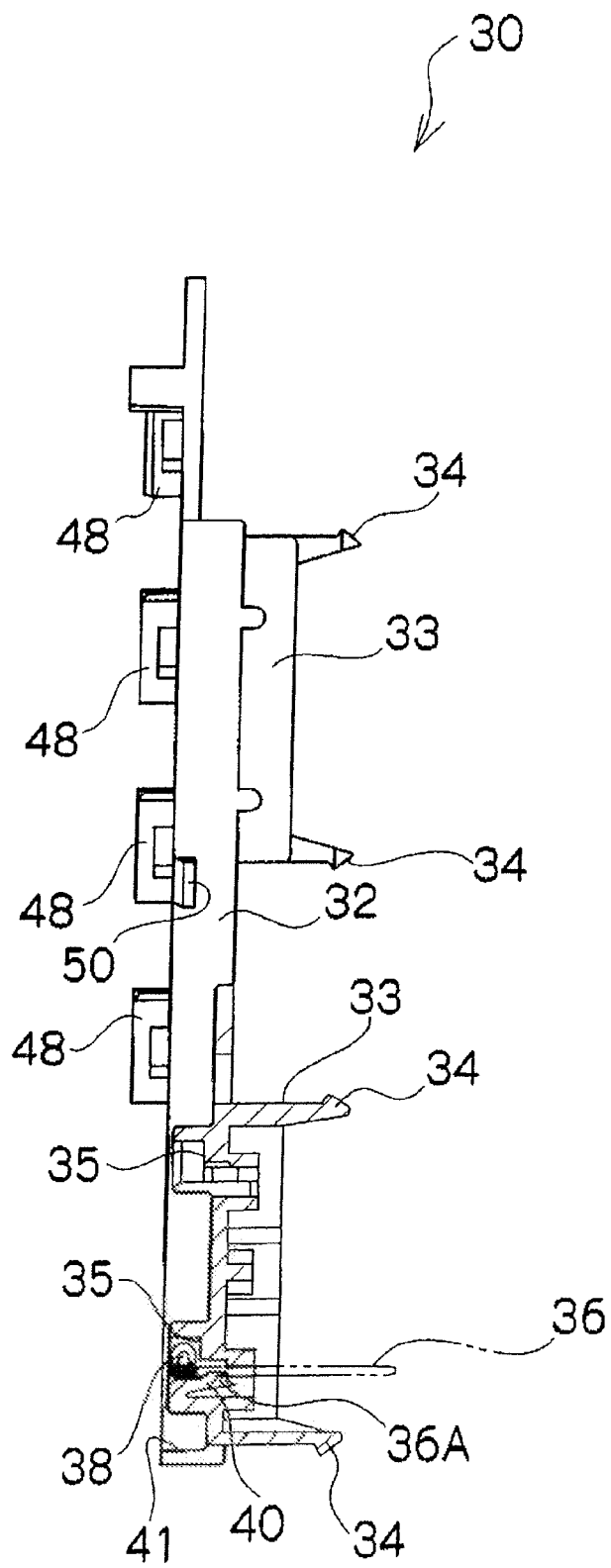
FIG. 7 is a cross-section taken on 7-7 of FIG. 6.
Figure 8:
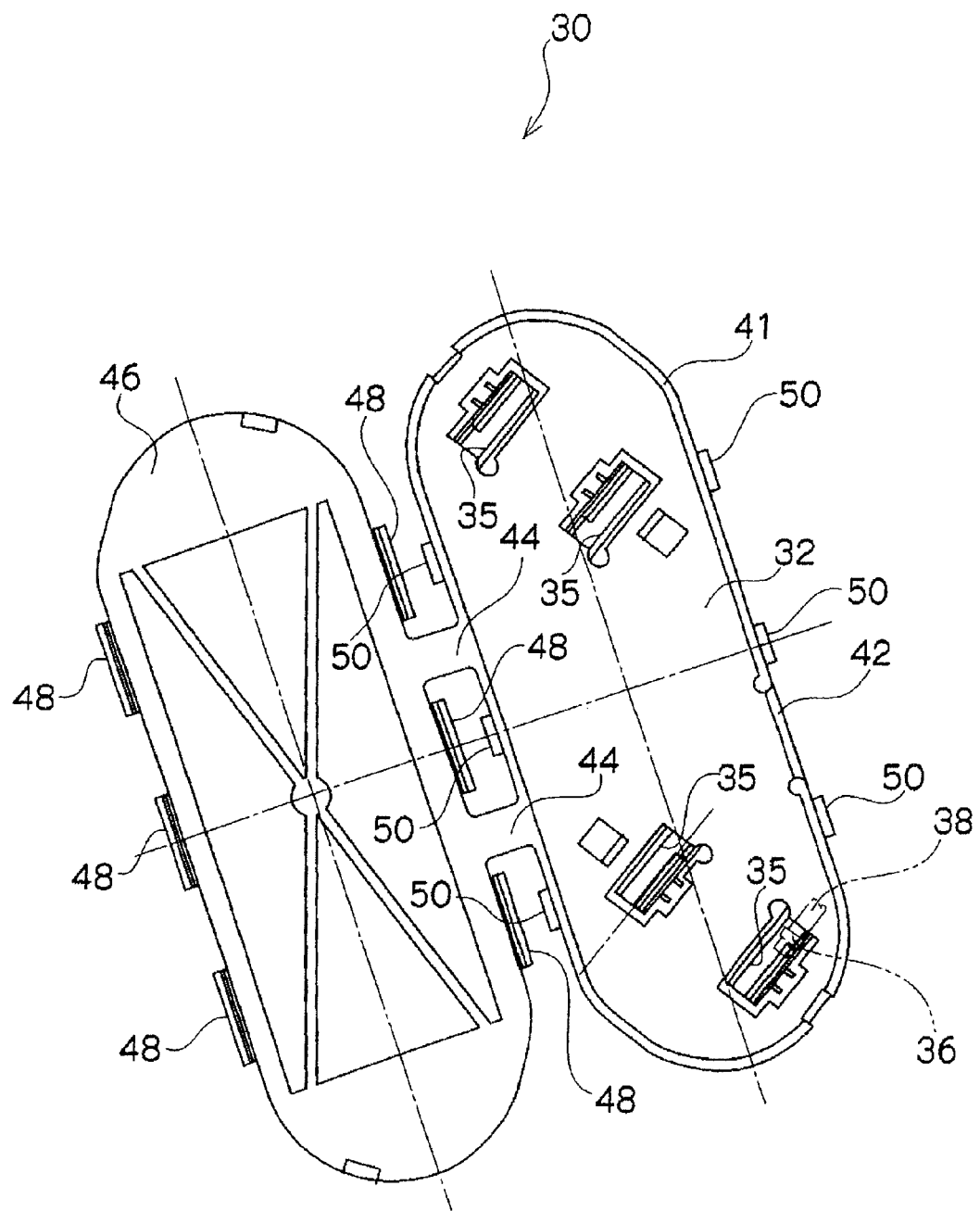
FIG. 8 is a back view of the connector shown in FIG. 6.

The cover 46, as shown in FIG. 7, also has integral loop shaped fixing loop portions 48 on both sides of the longitudinal center line. As shown in FIG. 6, plural of the fixing loop portions 48 are provided at predetermined intervals on the edge portions of the cover 46 at both sides of the longitudinal center line (three on each side in the present exemplary embodiment). When, as shown in FIG. 5, the cover 46 is in the state of being disposed on the back face side of the closure plate 32, the fixing loop portions 48 are positioned at the outside of the surrounding wall 41 shown in FIG. 9.

The closure plate 32, as further shown in FIG. 7, has integral fixing protrusions 50 corresponding to the fixing loop portions 48. There are plural of the fixing protrusions 50, as shown in FIG. 6, provided at predetermined intervals on the outer peripheral surface of the surrounding wall 41 shown in FIG. 9 on both sides of the closure plate 32 longitudinal center line (three on each side in the present exemplary embodiment). Since, the fixing protrusions 50 fit into the fixing loop portions 48 when the cover 46 is placed on the back face side of the closure plate 32, the cover 46 is fixed to the back face side of the closure plate 32 (see FIG. 5). When the cover 46 is in the state of being fixed to the back face side of the closure plate 32 in this manner, the closure plate 32 side of the cover 46 abuts the surrounding wall 41, and the back face side of the closure plate 32 is closed.

Next, the operation of the first exemplary embodiment will be explained.

In the mirror angle adjustment device 10 of the present exemplary embodiment, the retaining portion 14 of the case 12 swingably retains the mirror body 13 at the center of gravity thereof, and the mirror body 13 is rotatably retained at the leading end of each of the pair of rods 18 provided on the case 12. Also, a pair of motors 20 are provided within the case 12, and, by supplying power to each of the motors 20 and driving each of the motors 20, each of the rods 18 is displaced in the vehicle front-rear direction, thereby swinging the mirror body 13 with the retaining portion 14 at the center, and adjusting the mirror angle of the mirror body 13.

Furthermore, the connector 30 fitted to the case 12 is provided with terminals 36, and by inserting the terminals 36 into the insertion holes 24 formed in the case 12, the terminals 36 are connected to the receiving terminals 22 provided on the motors 20. Furthermore, the terminals 36 are connected to the power source (omitted in the illustrations) via the wire harnesses 38, and power is supplied to the receiving terminals 22 via the wire harnesses 38 and the terminals 36. In this way, power is supplied to the motors 20 and the motors 20 are driven.

The fitting holes 28 of the case 12 are fitted together with the fitting lugs 34 of the closure plate 32 of the connector 30, and the back face side of the case 12 is closed off by the closure plate 32 of the connector 30. Therefore, ingress of water into the insertion holes 24 side is suppressed.

In the connector 30, the terminals 36 are inserted into the terminal retaining sockets 35 of the closure plate 32 and retained, and at the connection portions of the terminals 36 and the wire harnesses 38, the longitudinal direction of the terminals 36, and the axial direction of the wire harnesses 38 are substantially orthogonal to each other along the width direction of the terminals 36. Therefore, even if a pulling-out force acts on the wire harnesses 38, the pulling-out force is not parallel to the direction of insertion/extraction of the terminals 36, and so the component of the pulling-out force acting on the wire harnesses 38 that is in the direction of insertion/extraction of the terminals 36 is reduced to be smaller than the pulling-out force acting on the wire harnesses 38 (to practically zero). Therefore, the terminals 36 do not readily come out from the terminal retaining sockets 35. In addition, the pulling-out force which acts on the terminals 36, generated by the action of the pulling-out force on the wire harnesses 38, is taken by the closure plate 32 at the terminal retaining sockets 35 via the terminals 36. Furthermore, in the terminals 36, openings 36A are engaged with the lances 40 integrally formed at the inner peripheral face of the terminal retaining sockets 35 of the closure plate 32. As a result, the terminals 36 are prevented, with certainty, from coming out of the terminal retaining sockets 35 of the closure plate 32. In this way, in the present connector 30 (and therefore also in the mirror angle adjustment device 10) there is no necessity to run the wire harnesses 38 out from the case 12 side of the closure plate 32 and around the back face side thereof in order to prevent the terminals 36 coming out, as is the case in a conventional connector (and in the case of a conventional mirror angle adjustment device). Therefore the workability of assembly may be increased.

In the connector 30, the wire harnesses 38 connected to respective of the terminals 36 are bundled together at the guide groove 42 provided in the surrounding wall 41 of the closure plate 32. Due to this, there is no need to provide a separate member for bundling together the wire harnesses 38 connected to each of the terminals 36, and wire harnesses 38 may be bundled together simply by the closure plate 32 alone.

Also, since, in the connector 30, the hinge portions 44 between the cover 46 and the closure plate 32 are resiliently deformable, when the cover 46 is mounted to the back face side of the closure plate 32, by resilient deformation of the hinge portions 44, the cover 46 is rotated relative to the closure plate 32 and the cover 46 is mounted to the back face side of the closure plate 32. Therefore, even without providing a separate hinge for making the cover 46 rotatable relative to the closure plate 32 about the connecting portions with the closure plate 32, the cover 46 may be made to rotate relative to the closure plate 32. Therefore, the alignment of the mounting position of the cover 46 to the closure plate 32 becomes easier.

Furthermore, in the connector 30, the surrounding wall 41 of the closure plate 32 is closed off by the cover 46. Therefore, the terminal retaining sockets 35 are covered by the cover 46 at the back face side of the closure plate 32. In this way, the terminals 36 may be made waterproof.

Also, in the connector 30, the closure plate 32 and the cover 46 are integrated via the hinge portions 44. Therefore, when manufacturing the closure plate 32, the cover 46 and the hinge portions 44, these the closure plate 32, the cover 46 and the hinge portions 44 may be formed together. By doing so, the closure plate 32, the cover 46, and the hinge portions 44 may be manufactured with a single mold. Therefore, the mold costs may be reduced.

Second Exemplary Embodiment

Next, a mirror angle adjustment device 10 relating to a second exemplary embodiment of the present invention will be explained. The mirror angle adjustment device 10 relating to the second exemplary embodiment of the present invention is one in which, for the connector 30, the shapes of the closure plate 32 and the cover 46 are changed. Below, those elements of the configuration similar to those of the above first exemplary embodiment will be allocated the same reference numerals, and explanation thereof will be omitted.

Figure 12:
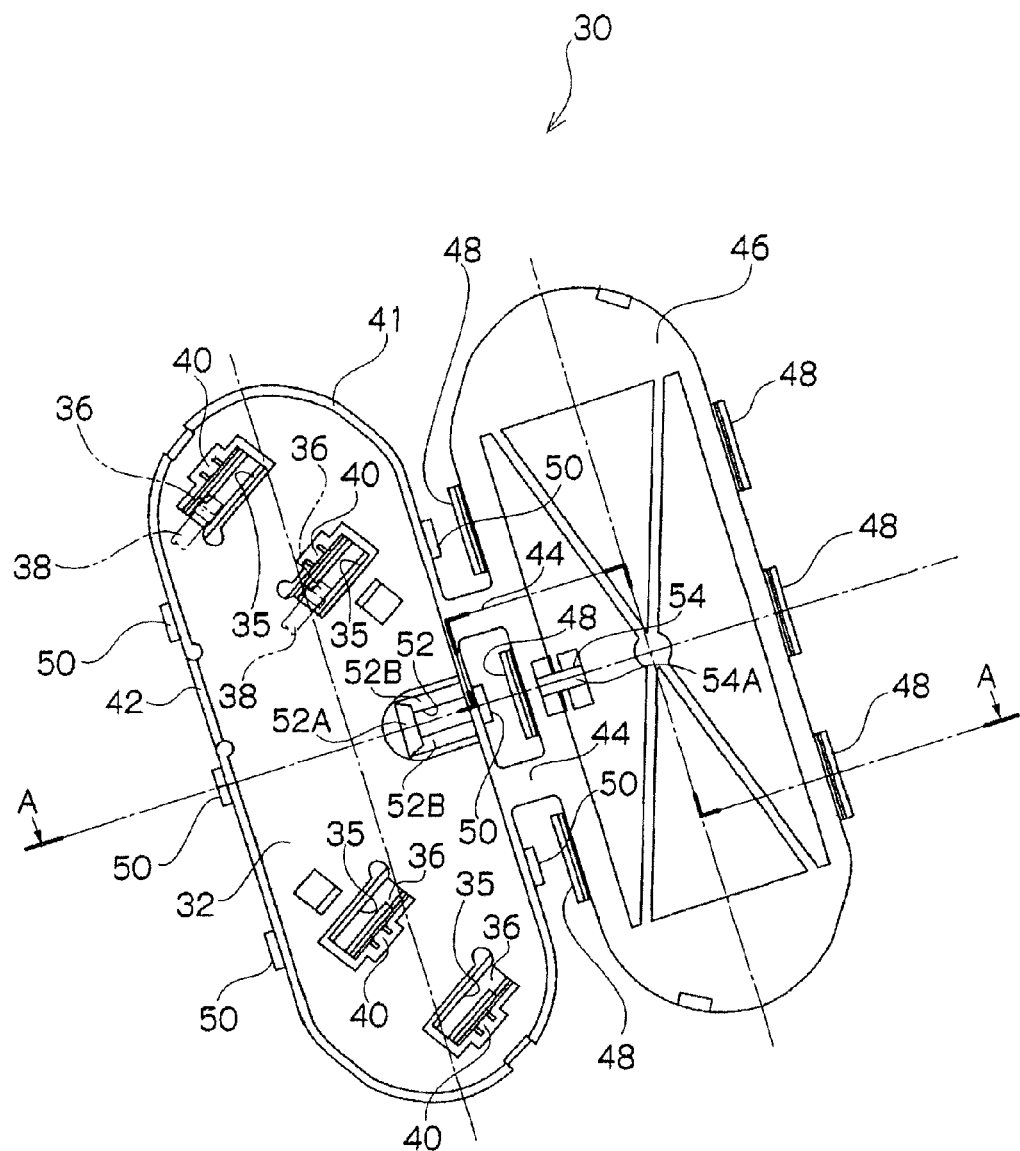
FIG. 12 is a back view of the connector relating to the second exemplary embodiment of the present invention corresponding to FIG. 8.
Figure 13:
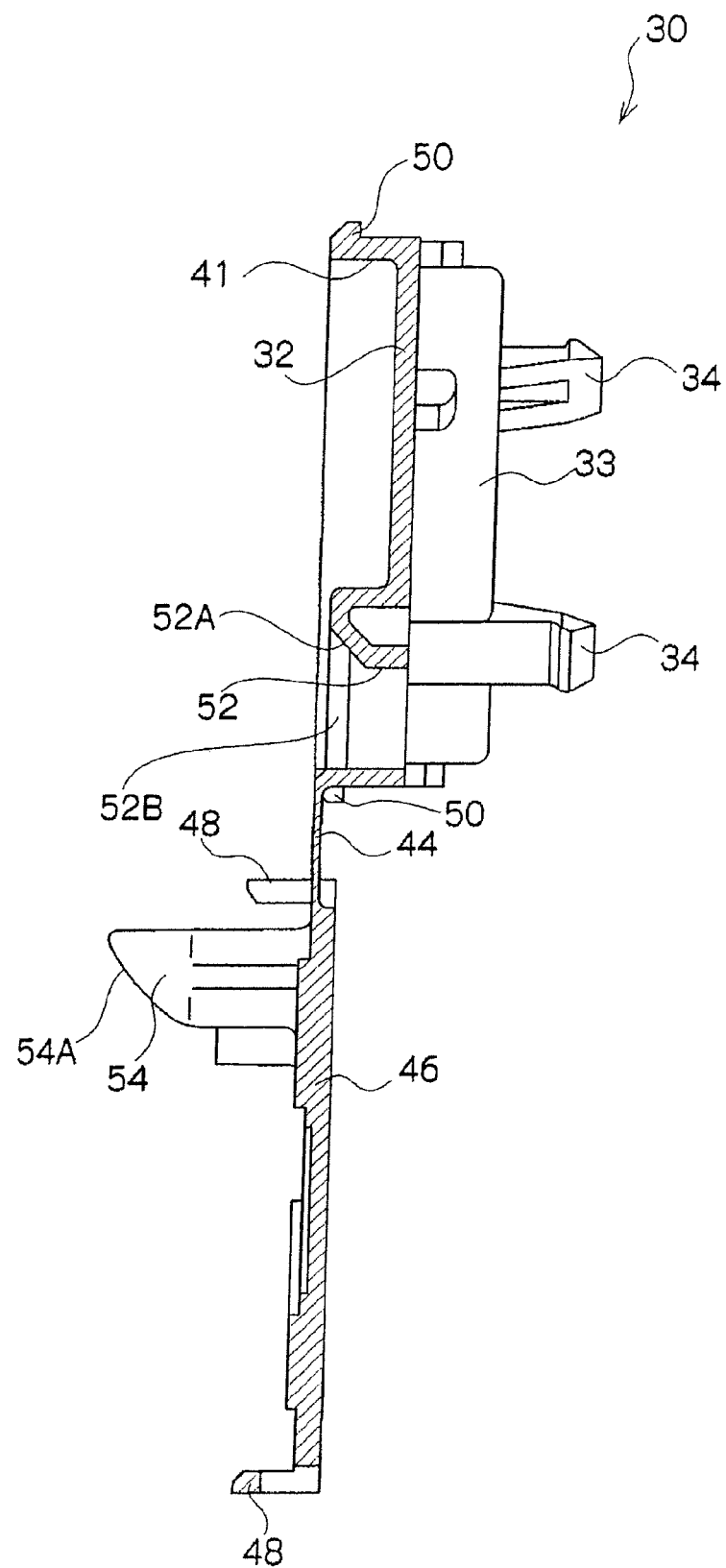
FIG. 13 is a cross-section taken on A-A of FIG. 12.

In the connector 30, as shown in FIG. 12 and FIG. 13, the closure plate 32 has a substantially rectangular hole shaped guide hole 52 as a guide portion. The guide hole 52 is at a central portion in the longitudinal direction of the closure plate 32, and formed on the inside of the surrounding wall 41 in the vicinity of the hinge portions 44 (in FIG. 12 and FIG. 13 on the cover 46 side). There is a sloping portion 52A, as a sloping part of the guide hole 52, where a portion on the opposite side of the guide hole 52 to the side of the hinge portions 44, in a direction orthogonal to the longitudinal direction of the closure plate 32, slopes toward the hinge portions 44 side on progression from the back face side of the closure plate 32 to the case 12 side.

Also, in the cover 46, corresponding to the guide hole 52 of the closure plate 32, there is a thin plate shaped guide piece 54, which configures the guide portion together with the guide hole 52. The guide piece 54 is on the front face of the cover 46 (the face that opposes the back face of the closure plate 32 when the cover 46 covers the back face of the closure plate 32), and is formed protruding up from the cover 46, with the plate thickness direction of the guide piece 54 parallel to the longitudinal direction of the closure plate 32. The guide piece 54 is at a central portion in the longitudinal direction of the cover 46, and is positioned in the vicinity of the hinge portions 44 (in FIG. 12 and FIG. 13 on the closure plate 32 side), and the position of the guide piece 54 substantially superimposes onto the position of the guide hole 52 of the closure plate 32 when the cover 46 covers the back face of the closure plate 32 (when the cover 46 is mounted to the back face side of the closure plate 32, the guide piece 54 and the guide hole 52 are in superimposed positions, and this is equivalent to the engagement position of the guide piece 54 and the guide hole 52).

Figures 14A, 14B:
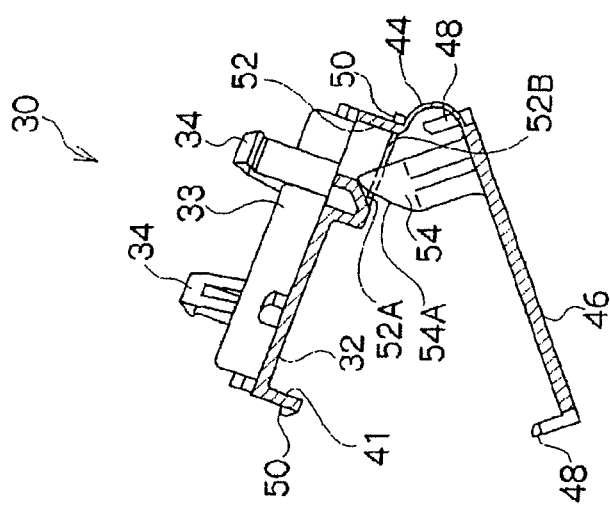
FIG. 14A is a cross-section of the connector corresponding to FIG. 13, showing a state before assembly of the cover to the closure plate.
FIG. 14B is a cross-section of the connector corresponding to FIG. 13, showing an intermediate state during assembly of the cover to the closure plate (a state in which the cover is being guided by guide portions into a mounting position to the closure plate)
Figure 14C:
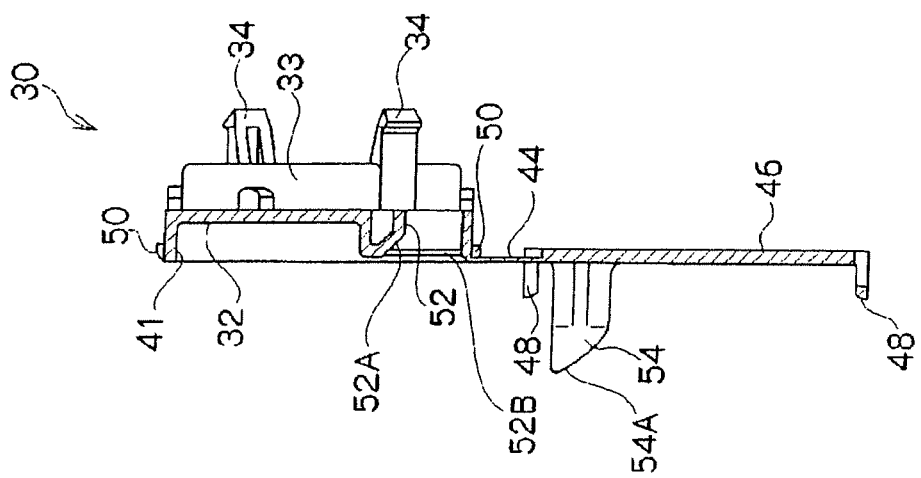
FIG. 14C is a cross-section of the connector corresponding to FIG. 13, showing a state after assembly of the cover to the closure plate.

At a leading end portion of the guide piece 54 (the end portion that is on the opposite side to that of the cover 46) there is a portion 54A on the opposite side of the guide piece 54 to that of the hinge portions 44, in the direction that is orthogonal to the longitudinal direction of the cover 46, which has a rounded slope toward the hinge portions 44 side on progression from the cover 46 side to the leading end side (the rounded portion 54A is a sloping portion formed substantially in the shape of an R). When the cover 46 is rotated relative to the closure plate 32 toward the back face side of the closure plate 32 from the state before assembly operation of the cover 46 to the closure plate 32, as shown in FIG. 14A, before the fixing protrusions 50 of the closure plate 32 fit into the fixing loop portions 48 of the cover 46, the rounded portion 54A of the leading end portion of the guide piece 54 abuts the sloping portion 52A of the guide hole 52, and the leading end portion of the guide piece 54 (the rounded portion 54A) slides on the sloping portion 52A of the guide hole 52, as shown in FIG. 14B, and the cover 46 is guided into the mounting position to the closure plate 32 (the guide piece 54 is guided into the engagement position with the guide hole 52), as shown in FIG. 14C.

The dimension of the guide piece 54 in the plate thickness direction (the dimension in the longitudinal direction of the cover 46) is of the same order as the dimension of the guide hole 52 in the longitudinal direction of the closure plate 32. A pair of taper portions 52B of the guide hole 52 in the longitudinal direction of the closure plate 32 is formed in a taper shape so that the distance there between narrows on progression from the back face side of the closure plate 32 toward the case 12 side (these taper portions 52B are equivalent to taper-shaped portions). Thereby, when the guide piece 54 is inserted into the guide hole 52, even if there is a difference in the position of the cover 46, in the longitudinal direction of the closure plate 32, relative to the mounting position, the guide piece 54 of the cover 46 (in the main, the rounded portion 54A of the end portion of the guide piece 54) slides along the taper portions 52B of the guide hole 52, and the cover 46 is guided in the longitudinal direction of the closure plate 32 into the mounting position of the cover 46.

In the above manner, when the cover 46 is mounted to the back face side of the closure plate 32, correct positioning may be made in both the longitudinal direction of the closure plate 32 and the direction orthogonal to the longitudinal direction thereof (the guide piece 54 is correctly positioned by the engagement position with the guide hole 52).

Next, the operation of the second exemplary embodiment of the present invention will be explained.

In that the fitting holes 28 of the case 12 fit together with the fitting lugs 34 of the closure plate 32 of the connector 30, and the back face side of the case 12 is substantially closed by the closure plate 32 of the connector 30, the second exemplary embodiment is the same as the above first exemplary embodiment in the point that the ingress of water to the insertion holes 24 side is suppressed.

Also, in that there is no necessity to run the wire harnesses 38 connected to the terminals 36 out from the case 12 side of the closure plate 32 and around to the back face side thereof, the second exemplary embodiment is the same as the above first exemplary embodiment in the point that the workability of assembly is increased.

Also, at the connection portions of the terminals 36 with the wire harnesses 38, the longitudinal direction of the terminals 36 intersects with the axial direction of the wire harnesses 38, and so the second exemplary embodiment is the same as the above first exemplary embodiment in that the wire harnesses 38 are not readily pulled out of the closure plate 32. Furthermore, the pulling-out force acting on the terminals 36 is taken by the closure plate 32 via the terminal retaining sockets 35, and so the second exemplary embodiment is the same as the above first exemplary embodiment in that there is improved certainty of retaining of the terminals 36. In this case, the openings 36A of the terminals 36 are engaged with the lances 40 integrally formed in the inner peripheral face of the terminal retaining sockets 35, and, therefore, the second exemplary embodiment is the same as the above first exemplary embodiment also in that prevention of pulling-out of the terminals 36 from the terminal retaining sockets 35 may be assured.

The second exemplary embodiment is also the same as the above first exemplary embodiment in that there is no need to provide separate members for bundling together each of the wire harnesses 38 connected to the respective terminals 36, and wire harnesses 38 may be bundled together simply by the closure plate 32 alone.

The second exemplary embodiment is the same as the above first exemplary embodiment also in that by resilient deformation of the hinge portions 44, positional alignment may be readily made of the cover 46 to the closure plate 32. In the connector 30, in contrast to when the cover 46 and the closure plate 32 are made as separate members, the rotating radius of the cover 46 relative to the closure plate 32 is substantially uniform, due to the hinge portions 44. Therefore, the guide piece 54 of the cover 46 may be guided smoothly to the sloping portion 52A and the taper portions 52B of the guide hole 52 of the closure plate 32. Furthermore, by the rounded portion 54A at the leading end portion of the guide piece 54 sliding on at least one of the sloping portion 52A or the taper portions 52B of the guide hole 52, the guide piece 54 is inserted into the guide hole 52. Therefore, since the position of the guide piece 54 is superimposed on the position of the guide hole 52, the second exemplary embodiment is the same as the above first exemplary embodiment also in that alignment of the mounting position of the cover 46 to the closure plate 32 may be readily made.

The second exemplary embodiment is the same as the above first exemplary embodiment also in that, in the connector 30, the surrounding wall 41 of the closure plate 32 is closed off by the cover 46, and the terminals 36 may be made waterproof.

Also, second exemplary embodiment is the same as the above first exemplary embodiment also in that, in the connector 30, the closure plate 32 is made as one unit with the cover 46, via the hinge portions 44, and so when manufacturing the closure plate 32, the cover 46 and the hinge portions 44, the mold cost may be reduced.

In the first exemplary embodiment and the second exemplary embodiment of the present invention, the hinge portions 44 that connect the closure plate 32 with the cover 46 are made resiliently deformable, but in the present invention the hinge portions 44 may instead be plastically deformable.

Also, the second exemplary embodiment of the present invention is configured such that the cover 46 is guided to the mounting position with the closure plate 32 by both the guide hole 52 of the closure plate 32 and by the guide piece 54 of the cover 46, but in the present invention it may be configured such that at least one of the closure plate 32 or the cover 46 is provided with a guide portion for guiding the cover 46 to the mounting position with the closure plate 32 (for example, the sloping portion 52A and the taper portions 52B of the guide hole 52 may be omitted).

What is claimed is:

1. A mirror angle adjustment device comprising:
   a case provided at a vehicle rear view mirror body, and
   a connector disposed in said vehicle rear view mirror body and having
      a terminal including an elongated member having a leading end portion, the terminal being connected along its longitudinal axis to one end of a wire harness, the axial direction of the wire harness intersecting with the longitudinal axis of the terminal at a connecting portion therebetween;
      a connector housing, including a guide groove for receiving the wire harness, and a terminal retaining socket that retains the terminal and which extends through the connector housing, the terminal being inserted into the terminal retaining socket from a back face side of the connector housing and retained, with the leading end portion of the terminal protruding to a front face side of the housing, the front face side of the connector housing being fittable over said case, and the leading end portion of the terminal being electrically connected to a power supply point on the case when the front face side of the connector housing is fitted together with said case; and a cover that is substantially plate shaped and which covers the back face side of the connector housing;
   wherein a pulling-out force applied to a portion of the wire harness outside of the connector housing conducted through the guide groove and applied to the terminal in a direction transverse to the direction of insertion/extraction of the terminal is resisted by the portion of the connector housing defining said terminal retaining socket; and
   wherein at least one of the housing or the cover is provided with a guide portion that guides the cover to a mounting position at the housing.

2. The mirror angle adjustment device of claim 1, wherein:
   there are a plurality of the terminals mounted at the connector housing, and the back face side of the connector housing is provided with a surrounding portion that surrounds mounting portions of the plurality of terminals in a frame shape; and
   said guide groove is provided at the surrounding portion, bundling together the wire harnesses connected to each of the plurality of terminals.

3. The mirror angle adjustment device of claim 1, wherein:
   the cover is integrally connected to an edge portion of the connector housing, and a connecting portion there between is resiliently deformable or is plastically deformable, and the cover is mounted to the back face side of the connector housing by resilient deformation or by plastic deformation of the connecting portion, and by rotating the cover relative to the connector housing.

4. The mirror angle adjustment device of claim 2, wherein:
   the cover is integrally connected to an edge portion of the connector housing, and a connecting portion therebetween is resiliently deformable or is plastically deformable, and the cover is mounted to the back face side of the connector housing by resilient deformation or by plastic deformation of the connecting portion, and by rotating the cover relative to the connector housing.

5. The mirror angle adjustment device of claim 1, wherein the guide portion includes:
   a guide opening provided on one of the housing or the cover; and
   a guide protrusion, provided on the other of the housing or the cover, that engages with the guide opening,
   at least one of the guide opening or the guide protrusion being provided with a sloping portion or a tapered portion for leading the guide protrusion to an engagement position with the guide opening.

6. The mirror angle adjustment device of claim 1, wherein:
   an opening is formed in the terminal; and
   a lance is formed integrally to an inner peripheral face of the terminal retaining socket, the lance being resiliently deformable, and being swingable by resilient deformation by being pushed by the terminal when the terminal is inserted into the terminal retaining socket, the lance resiliently recovering, when the terminal is inserted into the terminal retaining socket and reaches the alignment position, and engaging with the opening of the terminal.

7. The mirror angle adjustment device of claim 1, wherein the guide groove of the connector housing conducts and directs a pulling-out force applied to a portion of the wire harness outside of the connector housing in a direction about 90° transverse to said direction of insertion and extraction.

8. A mirror angle adjustment device, comprising:
a connector;
a case, provided at a rear face side of a vehicle rear view mirror body and provided with retaining portions which swingably retain the mirror body, the case being fitted to a front face side of a housing of the connector as a body to be fitted to; and
a swing portion that includes a motor that is provided inside of the case and that is a power supply point and is connected to a terminal of the connector, the swing portion adjusting the mirror angle of the mirror body by swing the mirror body when power is supplied to the motor and the motor driven,
the connector including:
a terminal having an elongated member insertably connected along its longitudinal axis to one end of a wire harness, the axial direction of the wire harness intersecting with the longitudinal direction of the terminal at a connecting portion therebetween;
a connector housing, including a guide groove for receiving the wire harness, and a terminal retaining socket that extends through a wall of the connector housing that retains the terminal, the terminal being inserted into the terminal retaining socket from a back face side of the connector housing and retained, with the leading end portion of the terminal protruding to a front face side of the connector housing, and the front face side of the connector housing being fittable over said case, the terminal being connected to a power supply point on the case when said front face side of the connector housing is fitted together with the case; and
a cover that is substantially plate-shaped and covers the back face side of the connector housing;
wherein the guide groove of the connector housing conducts a pulling-out force applied to a portion of the wire harness outside of the connector housing in a direction transverse to the direction of insertion and extraction of said terminal and said pulling out force is resisted by the portion of the connector housing defining said terminal retaining socket; and
wherein at least one of the housing or the cover is provided with a guide portion that guides the cover to a mounting position at the housing.

9. The mirror angle adjustment device of claim 8, wherein:
there are a plurality of the terminals mounted at the connector housing, and the back face side of the connector housing is provided with a surrounding portion that surrounds mounting portions of the plurality of terminals in a frame shape; and
said guide groove is provided at the surrounding portion, bundling together the wire harnesses connected to each of the plurality of terminals.

10. The mirror angle adjustment device of claim 8, wherein:
the cover is integrally connected to an edge portion of the connector housing, and the connecting portion therebetween is resiliently deformable or is plastically deformable, and the cover is mounted to the back face side of the connector housing by resilient deformation or by plastic deformation of the connecting portion, and by rotating the cover relative to the connector housing.

11. The mirror angle adjustment device of claim 8, wherein the guide portion includes:
a guide opening provided on one of the housing or the cover; and
a guide protrusion, provided on the other of the housing or the cover, that engages with the guide opening,
at least one of the guide opening or the guide protrusion being provided with a sloping portion or a tapered portion for leading the guide protrusion to an engagement position with the guide opening.

12. The mirror angle adjustment device of claim 8, wherein:
an opening is formed in the terminal; and
a lance is formed integrally to an inner peripheral face of the terminal retaining socket, the lance being resiliently deformable, and being swingable by resilient deformation by being pushed by the terminal when the terminal is inserted into the terminal retaining socket, the lance resiliently recovering, when the terminal is inserted into the terminal retaining socket and reaches the alignment position, and engaging with the opening of the terminal.

13. The mirror angle adjustment device of claim 8, wherein the guide groove of the connector housing conducts and directs a pulling-out force applied to a portion of the wire harness outside of the connector housing in a direction about 90° transverse to said direction of insertion and extraction.

\* \* \* \* \*